(12) United States Patent
Hagen et al.

(10) Patent No.: US 8,940,910 B2
(45) Date of Patent: *Jan. 27, 2015

(54) CLEANING DEVICE FOR SEPARATING DILACTIDE FROM MIXTURES, POLYMERISATION DEVICE, METHOD FOR SEPARATING DILACTIDE FROM MIXTURES AND USE THEREOF

(71) Applicant: Uhde Inventa-Fischer GmbH, Berlin (DE)

(72) Inventors: Rainer Hagen, Berlin (DE); Udo Muhlbauer, Berlin (DE)

(73) Assignee: Uhde Inventa-Fischer GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,050

(22) Filed: Sep. 13, 2013

(65) Prior Publication Data
US 2014/0011975 A1 Jan. 9, 2014

Related U.S. Application Data

(62) Division of application No. 12/676,214, filed as application No. PCT/EP2008/006965 on Aug. 25, 2008, now Pat. No. 8,569,517.

(30) Foreign Application Priority Data

Sep. 3, 2007 (EP) .................................... 07017237

(51) Int. Cl.
| | | |
|---|---|---|
| C07D 319/00 | (2006.01) | |
| C08G 63/08 | (2006.01) | |
| B01D 3/14 | (2006.01) | |
| C08G 63/78 | (2006.01) | |

(52) U.S. Cl.
CPC *C08G 63/08* (2013.01); *B01D 3/14* (2013.01); *B01D 3/141* (2013.01); *C08G 63/785* (2013.01)
USPC ........................................................ 549/274

(58) Field of Classification Search
CPC .................................................... C07D 319/12
USPC ........................................................ 549/274
See application file for complete search history.

(56) References Cited

U.S. PATENT DOCUMENTS

| | | | |
|---|---|---|---|
| 5,236,560 A | 8/1993 | Drysdale et al. | |
| 5,856,523 A | 1/1999 | Miao et al. | |
| 6,214,967 B1 * | 4/2001 | Jansson et al. | 528/354 |
| 8,569,517 B2 * | 10/2013 | Hagen et al. | 549/274 |
| 2010/0249364 A1 | 9/2010 | Hagen et al. | |

FOREIGN PATENT DOCUMENTS

| | | | |
|---|---|---|---|
| DE | 3820299 A1 | 12/1988 | |
| DE | 695 07 957 T2 | 10/1999 | |
| EP | 623153 | 11/1994 | |
| EP | 0 893 462 A2 | 1/1999 | |
| EP | 1136480 A1 | 9/2001 | |
| WO | WO-93/18020 A1 | 9/1993 | |
| WO | WO-95/09879 A1 | 4/1995 | |
| WO | WO 2005/056509 * | 6/2005 | ............... C07C 55/28 |
| WO | WO-2005/056509 A1 | 6/2005 | |

OTHER PUBLICATIONS

"U.S. Appl. No. 12/676,214, Examiner Interview Summary mailed Mar. 9, 2012", 3 pgs.
"U.S. Appl. No. 12/676,214, Final Office Action mailed Aug. 22, 2012", 10 pgs.
"U.S. Appl. No. 12/676,214, Non Final Office Action mailed Apr. 4, 2012", 7 pgs.
"U.S. Appl. No. 12/676,214, Notice of Allowance mailed Jun. 27, 2013", 8 pgs.
"U.S. Appl. No. 12/676,214, Response filed Feb. 29, 2012 to Restriction Requirement mailed Feb. 1, 2012", 10 pgs.
"U.S. Appl. No. 12/676,214, Response filed Jul. 19, 2012 to Non Final Office Action mailed Apr. 4, 2012", 15 pgs.
"U.S. Appl. No. 12/676,214, Response filed Nov. 5, 2012 to Final Office Action mailed Aug. 22, 2012", 12 pgs.
"U.S. Appl. No. 12/676,214, Restriction Requirement mailed Feb. 1, 2012", 6 pgs.
"Chinese Application No. 200880111392.1, English Translation of Chinese Office Action mailed Jan. 18, 2012", 26 pgs.
"European Application Serial No. 07017237.4, Search Report mailed Dec. 19, 2007", 6 pgs.
"International Application No. PCT/EP2008/006965, English Translation of International Preliminary Report on Patentability mailed Apr. 15, 2010", 9 pgs.
"International Application No. PCT/EP2008/006965, International Search Report and Written Opinion", (Jan. 5, 2009), 14 pgs.
"Canadian Application Serial No. 2,698,288, Office Action mailed Jul. 24, 2014"; 2 pgs.
"Korean Application No. 10-2010-7006700, First Communication mailed Jul. 29, 2014", [with English translation], 8 pgs.

* cited by examiner

*Primary Examiner* — Nizal Chandrakumar
(74) *Attorney, Agent, or Firm* — Schwegman Lundberg & Woessner, P.A.

(57) ABSTRACT

The present invention relates to a device for separating a biodegradable, intermolecular cyclic diester of an alpha-hydroxycarboxylic acid from material mixtures which contain in addition the alpha-hydroxycarboxylic acid of the diester corresponding thereto. In particular, the diester is thereby dilactide and the acid lactic acid. Furthermore, the present invention relates to a method for separating dilactide from material mixtures, which is based on a modified, distillative method. In addition, the present invention describes a polymerization device, in particular for preparing polylactide. Likewise, purposes of use of both the devices and of the method are indicated.

20 Claims, 9 Drawing Sheets

CLEANING DEVICE FOR SEPARATING DILACTIDE FROM MIXTURES, POLYMERISATION DEVICE, METHOD FOR SEPARATING DILACTIDE FROM MIXTURES AND USE THEREOF

PRIORITY CLAIM TO RELATED APPLICATIONS

This application is a division of and claims the benefit of priority to U.S. patent application Ser. No. 12/676,214, filed Mar. 3, 2010, which is a national stage application under 35 U.S.C. §371 of PCT/EP2008/006965, filed Aug. 25, 2008, and published as WO 2009/030395 A1 on Mar. 12, 2009, which claims priority to European Application No. 07017237.4, filed Sep. 3, 2007, which applications and publication are incorporated herein by reference and made a part hereof in their entirety, and the benefit of priority is claimed thereto.

In an embodiment, the present invention relates to a device for separating a biodegradable, intermolecular cyclic diester of an alpha-hydroxycarboxylic acid from material mixtures which contain in addition the alpha-hydroxycarboxylic acid of the diester corresponding thereto. In particular, the diester is thereby dilactide and the acid lactic acid. Furthermore, the present invention relates to a method for separating dilactide from material mixtures, which is based on a modified, distillative method. In addition, the present invention describes a polymerisation device, in particular for preparing polylactide. Likewise, purposes of use of both the devices and of the method are indicated.

In the production of polylactide, the purity of the monomer, of the dilactide, is an important variable. It determines the achievable molecular weight and hence the mechanical properties of the polymer. The monomer is produced during depolymerisation of a lactic acid prepolymer and normally contains the following impurities: water, lactic acid, lactoyllactate and oligomers of the lactic acid. The cleaning of the monomer can be effected by crystallisation or by rectification. For example, DE 69 507 957 and also EP 1 136 480 describe the cleaning of dilactide by crystallisation. It is thereby disadvantageous that the dilactide is obtained only with inadequate purity by means of a single crystallisation. By means of a plurality of crystallisation steps, in fact the desired purity is obtained but this is associated with great complexity and high costs.

Likewise, the cleaning by rectification is known for example from EP 623 153, U.S. Pat. No. 5,236,560 or WO 2005/056509. It is thereby disadvantageous with the known rectification methods that a system comprising two rectification columns must always be used, which are still unsatisfactory in their result. In the first column, the light fractions (water and lactic acid) are thereby distilled via the top, dilactide and oligomers are obtained in the sump. In the second column, dilactide is produced as cleaned top product and the oligomers in the sump.

As an alternative to the 2-column system, a rectification column with a side discharge is described (U.S. Pat. No. 5,236,560), as a result of which the required purity is achieved even with one column. The disadvantage of this embodiment is that the side flow must be withdrawn in the form of vapour, which in practice is difficult to achieve.

Lactic acid is an optically active substance and occurs in the L(+) and D(−) form. The cyclic diester hence exists in three enantiomeric forms, L,L-dilactide (L-dilactide), D,D-dilactide (D-dilactide) and L,D-dilactide (mesodilactide). L-dilactide and D-dilactide have identical properties apart from the optical activity. Mesolactide is an optically inactive substance with a lower melting and boiling point than L- or D-dilactide. Mesolactide can hence be separated from L- or D-dilactide likewise both by rectification and by crystallisation. The subsequently described cleaning methods for L-lactide can be used also for D-lactide without technical alteration.

This document describes a device or a method with which as efficient and simple a separation as possible of dilactide from material mixtures can be achieved, the dilactide being able to be obtained with as high a material purity and/or optical purity as possible.

This can be achieved with respect to the cleaning device by the features of the patent claims. The respectively dependent claims thereby represent advantageous developments. Possibilities for use both of the devices and of the method are mentioned in the patent claims.

According to the invention, a cleaning device for separating a biodegradable, intermolecular cyclic diester of an alpha-hydroxycarboxylic acid of formula I is provided, Formula I R being selected from hydrogen or linear or branched aliphatic radicals with 1 to 6 carbon atoms, from material mixtures containing the diester of formula I and also the alpha-hydroxycarboxylic acid, corresponding thereto, of formula II, Formula II which comprises at least the following components which are arranged from top to bottom in the following sequence:

a) at the top, at least one dephlegmator and also at least one outlet,
b) at least one mass transfer packing which fills the diameter of the device at least partially (packing),
c) a dividing wall column which is divided into two zones by a vertical dividing wall (rectification column), each zone having at least two mass transfer packings (packings) which are separated from each other respectively by a gap, the first zone (prefractionation zone) having at least one inlet for supplying the material mixture and the second zone (main fractionation zone) having at least one side outlet for removing the cleaned product, and the at least one inlet and also the at least one side outlet being disposed respectively in the region of the at least one gap,
d) at least one further mass transfer packing (packing) which fills the diameter of the device at least partially,
e) on the sump side, at least one evaporator and at least one outlet, the length ratio of the dividing wall column to the total length of the device being 0.5 to 0.9.

The mass transfer packings (packings) which are present in the cleaning device are thereby selected from means which have a high surface area and hence ensure good evaporation of the throughflowing liquids. There are possible for this purpose in particular e.g. Raschig and/or Pall rings, saddles, such as e.g. Berl saddles, spheres, hooks, Top-Packs or packings made of fabric. Packings made of wire cloth are preferred because of the great separation capacity and the low pressure loss. It is likewise ensured by means of the large surface area that the cleaning device has a large number of theoretical bases and hence has a high separating capacity even of substances with boiling points which are very close to each other.

The dividing wall which divides the dividing wall column into a prefractionation zone and a main fractionation zone can thereby extend symmetrically, i.e. in that both zones have the same volume but also such that one of the two zones occupies a larger volume than the other zone i.e. an asymmetrical division. The asymmetrical division of the dividing wall can also be such that the dividing wall has an inclination and hence the ratio of the two rectification zones relative to each other changes over the length of the dividing wall column.

In an advantageous embodiment, the cleaning device has respectively gaps between the components designated with a) to e), i.e. the components are not assembled directly abutting against each other. The possibility thereby exists of disposing in each gap of the cleaning device devices for collecting the liquid trickling down over the packings and also for redistribution of the liquid over the packing cross-section. These devices make it possible to provide side outlets for the liquid or the vapours via which the removal of a cleaned product can be effected.

The evaporator disposed on the sump side is thereby preferably a falling-film evaporator. It is achieved by a falling-film evaporator that as large a surface area as possible of the material mixture to be evaporated is achieved, which has proved to be advantageous in particular when handling thermally sensitive products. This makes possible a sustained reduction in the dwell time of the material mixture in the sump.

The dividing wall column of the cleaning device can be configured in various advantageous embodiments. It is therefore possible for example that the main fractionation zone has two mass transfer packings which are separated by a gap and one or more side outlets are disposed at the level of this gap.

Alternatively hereto, it is however also possible that the main fractionation zone of the dividing wall column has three mass transfer packings, these being separated respectively by a gap. Both the embodiment is hereby conceivable that both gaps respectively have at least one side outlet and the embodiment that only one of the two gaps, for example either the upper or the lower gap, has one or more side outlets.

In order to make possible also concentration or pure preparation of the optical isomers of the diester, it is advantageous if, subsequent to at least one of the side outlets of the cleaning device, at least one further cleaning device is connected. This can be for example a rectification and/or crystallisation device, however a further cleaning device configured according to claim 1 as a subsequent cleaning device is likewise conceivable. This possibility is represented in claim 16 and in FIG. 8. In principle, the arrangement of the further cleaning devices is thereby possible at each side outlet of the cleaning device. Embodiments are thereby conceivable that merely one further cleaning device or also a plurality of further cleaning devices is present. It is thereby preferred in particular that the further cleaning device is connected to one or more of the side outlets of the dividing wall column. However it is likewise advantageous if the further cleaning device, in particular a rectification device, is connected to the cleaning device directly above the dividing wall via a side outlet which is provided in the gap between the dividing wall and the packing disposed thereabove.

The further cleaning devices, in particular the rectification, crystallisation devices or the further cleaning device which includes a dividing wall column are thereby advantageously connected via a recirculation to the inlet of the dividing wall column. It is hence ensured that as little as possible of the originally used material mixture is lost during the separation process. In the case where the further cleaning device is a rectification column, preferably the sump product of this column is recirculated.

Likewise, it is however possible in an advantageous manner that at least one further cleaning device is disposed before the inlet of the cleaning device. This further cleaning device can likewise represent a rectification and/or crystallisation device. By means of this embodiment, the separating capacity of the entire cleaning device is further improved according to claim 1.

Furthermore, a preferred embodiment of the cleaning device is hence conceivable in which a further cleaning device is connected before and after the cleaning device which includes the dividing wall column.

The above-mentioned embodiments in which, in addition to the first cleaning device which includes a dividing wall column, also further cleaning devices are connected either before and/or thereafter, make possible, in particular when using crude dilactide fractions which are intended to be cleaned, optimum yields of mesolactide-optimised fractions. It is thus possible to produce fractions with a mesolactide content of greater than 90%, in the case of a simultaneous free acid group concentration below 10 mmol/kg. Furthermore, it is possible to produce fractions with an L-dilactide content between 90 and 100%.

According to the invention, a polymerisation device for the polymerisation of a biodegradable, intermolecular cyclic diester of an alpha-hydroxycarboxylic acid of formula I is likewise provided,

Formula I

R being selected from hydrogen or linear or branched aliphatic radicals with 1 to 6 carbon atoms or preferably being dilactide, a previously described cleaning device being included.

There can be connected in the polymerisation device after the cleaning device, preferably a polymerisation reactor which is configured in particular in two stages and has a stirred vessel and also at least one tubular reactor subsequent thereto. In a variant of this type, direct further processing of the cleaned dilactide hence takes place. Alternatively hereto, it is however likewise possible to store the dilactide until polymerisation in liquid form.

It is thereby preferred likewise in this embodiment if in the polymerisation device there is connected after the cleaning device a condensation device for condensation of the vapours from the top of the rectification column (dephlegmator). There is understood by a condensation device thereby a device in which the vapours from the rectification column are condensed in the counterflow by direct contact with a washing liquid. An aqueous solution of the acid of formula II is used as condensation or washing liquid. There can be contained as further components in these material mixtures also water and/or di- or oligomers of the acid of formula II.

According to the invention, a method for at least partial separation of a biodegradable, intermolecular cyclic diester of an alpha-hydroxycarboxylic acid of formula I is likewise provided, Formula I R being selected from hydrogen or linear or branched aliphatic radicals with 1 to 6 carbon atoms, from material mixtures containing the diester of formula I and also the alpha-hydroxycarboxylic acid, corresponding thereto, of formula II Formula II by means of the following steps:
a) feeding the material mixture into a cleaning device which has a dividing wall column, the cleaning device having at least one side outlet,
b) separation of the material mixture, the acid of formula II being present in a vaporous aggregate state and
c) removal of the cleaned diester of formula I via the at least one side outlet.

There is thereby understood by at least partial separation that the diester of formula I is separated thereby at least partially from the material mixture.

The diester is preferably removed in a liquid aggregate state after the separation has been effected.

Lactic acid and also the linear oligomers and polymers thereof have one hydroxyl and one carboxyl end group per molecule. Since the carboxyl end groups are simpler to determine analytically (acid-base titration), the purity of the dilactide is indicated as a carboxyl end group concentration.

According to the invention, the diester of formula I can be obtained with the method with very high purity. Preferably, the concentration of free carboxylic acid groups (carboxyl end groups) is thereby at most 50 mmol/kg, preferably at most 30 mmol/kg, further preferred at most 20 mmol/kg, particularly preferred 10 mmol/kg.

In the material mixture, likewise further materials can be contained, selected from the group comprising water, corresponding oligomers of the alpha-hydroxycarboxylic acid of formula III, Formula III there being n=1 to 10 and R being defined as in the formulae I and II, and/or mixtures hereof.

The method likewise ensures that the alpha-hydroxycarboxylic acid of formula II and also water are withdrawn as top product and the oligomers of the alpha-hydroxycarboxylic acid of formula III as sump product.

According to the invention, the material mixture can be supplied to the dividing wall column in vaporous or liquid aggregate state or as a 2-phase mixture.

In order to conduct the method as efficiently as possible, it is preferred if the weight proportion of the cyclic diester of formula I in the material mixture supplied to the cleaning device is at least 50% by weight, preferably at least 75% by weight, particularly preferred at least 80% by weight.

The cleaning device is thereby operated preferably at pressures less than 120 mbar, preferably less than 100 mbar.

The introduction of the material mixture into the dividing wall column is effected at a temperature between 90° C. and 210° C., preferably between 110° C. and 140° C.

In particular, the cyclic diester of formula I is thereby dilactide and the alpha-hydroxycarboxylic acid of formula II lactic acid.

Since it is essential that the L-dilactide is obtained with high purity, at least one further separation step is effected in an advantageous embodiment after removal of the dilactide. This serves in particular for at least partial separation of L- and mesodilactide.

Various embodiments are hereby conceivable, however rectification and/or crystallisation are hereby applied preferably. It is likewise advantageous if the precleaned material mixture removed from the cleaning device is supplied to a further cleaning device which is configured according to claim 1 and hence has a further dividing wall column, in which cleaning device the separation of impurities which contain COOH groups and/or of optical isomers is continued and increased.

Alternatively hereto, it is however also possible that an efficient material separation (i.e. separation of the dilactide from the remaining components of the material mixture) and also separation of the stereoisomers of the dilactide is effected simultaneously already in the dividing wall column. For this purpose, an embodiment is provided in particular in which the dividing wall column has at least two side outlets, the first side outlet being disposed with respect to the further side outlet further towards the top on the cleaning device. Due to the difference in boiling points of mesodilactide and L-dilactide, it is hence made possible that a mesodilactide-rich fraction can be removed further towards the top and also an L-dilactide-rich fraction further towards the sump. The method is thereby efficient in such a manner that the content of the mesodilactide in the L-dilactide-rich fraction is at most 10% by weight, preferably at most 6% by weight, particularly preferred at most 4% by weight, or the content of the L-dilactide in the mesodilactide-rich fraction is at most 60% by weight, preferably at most 50% by weight, particularly preferred at most 40% by weight.

In a further advantageous embodiment, the content of the mesodilactide in the L-dilactide-rich fraction removed from the cleaning device can be further reduced by subsequent crystallisation.

It is likewise economical if the mesodilactide-rich fraction occurring during this crystallisation process is added again to the material mixture which is fed into the dividing wall column.

In a further advantageous embodiment, the content of the L-dilactide in the mesodilactide-rich fraction which is removed further towards the top on the dividing wall column (5) is further reduced by subsequent rectification. At the same time, the mesodilactide content of the fraction is increased and the carboxyl group concentration is reduced. The carboxyl group concentration is thereby preferably at most 20 mmol/kg, further preferred at most 10 mmol/kg, particularly preferred at most 5 mmol/kg, in particular at most 2 mmol/kg. The proportion of mesodilactide is preferably more than 70% by weight, particularly preferred more than 80% by weight and in particular more than 90% by weight. Analogously to the above, it is equally preferred again to add the L-dilactide-rich fraction obtained during the rectification to the material mixture which is fed into the dividing wall column.

In a preferred embodiment, the material mixture used originally in the dividing wall column originates from a preceding condensation device and/or crystallisation device.

The method is suitable in particular for operating an initially described cleaning device.

The cleaning device and also the method are used in the cleaning of dilactide, for the production of essentially enantiomer-pure L-dilactide and/or mesodilactide and/or in the production of polylactide. Both device and method are suitable in a similar manner for the production of cleaned, essentially enantiomer-pure D-lactide and for the production of poly-D-lactide.

The method is suitable preferably for the production of polylactide with a mesolactide content of more than 70% by weight, starting from a material mixture containing mesodilactide, with a polymerisation device, as described above, in which firstly, in the cleaning device, continuous separation of the mesodilactide from the material mixture is effected with continuous removal of the cleaned mesodilactide from the cleaning device and, subsequently, a polymerisation is implemented in the polymerisation device.

The polymerisation is thereby preferably controlled such that the obtained poly-mesolactide has a molar mass of 50,000 g/mol<$M_n$<2,000,000 g/mol.

The mesolactide proportion of the resulting polylactide is thereby preferably more than 70% by weight, preferably more than 80% by weight, in particular more than 90% by weight.

The present invention is described in more detail with reference to the accompanying Figures and also the examples described subsequently without wishing to restrict the invention to the parameters and value ranges mentioned there.

There are shown

Figure 1:
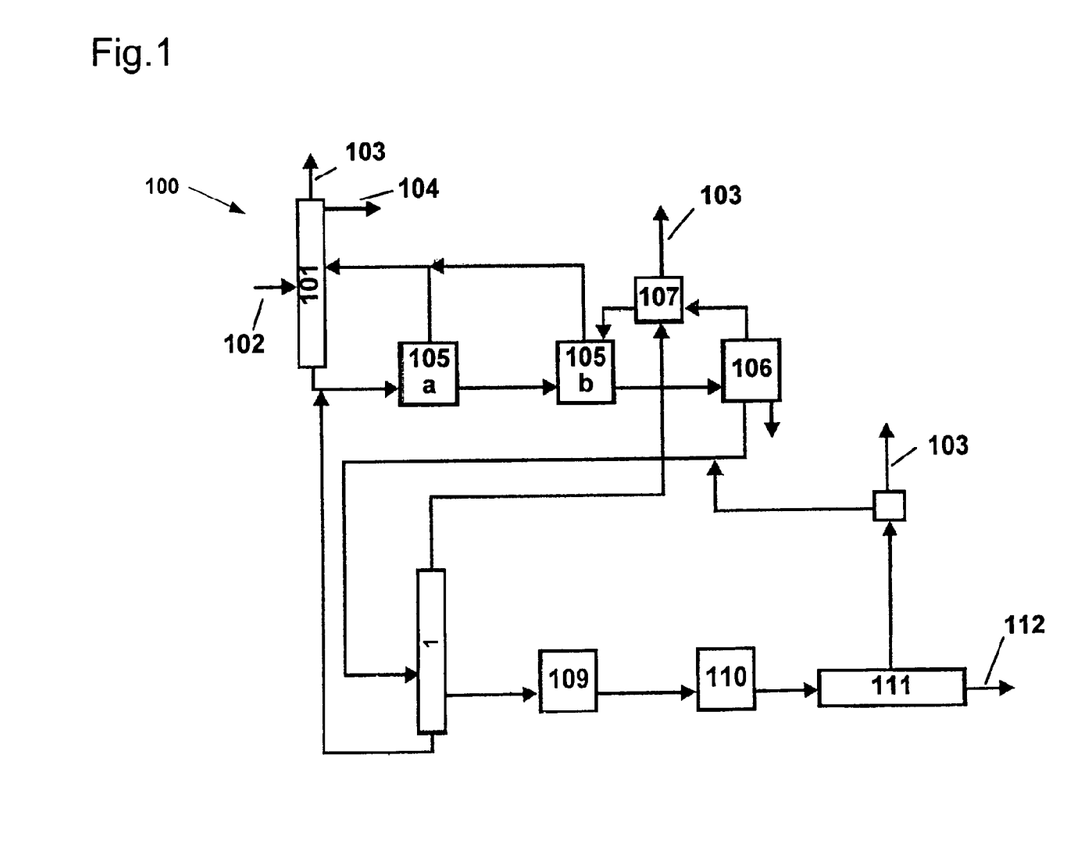
FIG. 1 an embodiment of a polymerisation device according to the invention with reference to a flow chart of a typical method implementation for the production of polylactide, starting from lactic acid, FIG. 2 a cleaning device according to the invention with an inlet and a side flow from which the cleaned dilactide is removed, FIG. 3 an alternative embodiment of the cleaning device according to the invention with which cleaning of dilactide and also the separation into a mesolactide-rich and a mesolactide-depleted fraction is possible at the same time, FIG. 4 an alternative embodiment of the cleaning device according to FIG. 3, here the side outlets being able to be disposed outwith the dividing wall region of the column, FIG. 5 a variant of the cleaning device in which the separation of meso- and L-dilactide is effected in a separate process step (15) after material cleaning of dilactide, FIG. 6 an embodiment of the cleaning device according to the invention, a further rectification column (16) being connected in order to reduce the content of L-dilactide in the mesolactide-rich fraction, FIG. 7 an embodiment according to the invention in which a rectification column (16) and a crystallisation device (18) are present in order to optimise the degree of purity both of the mesolactide-rich fraction and the L-lactide-rich fraction, FIG. 8 a further embodiment of the cleaning device according to the invention after which a further cleaning device comprising a dividing wall column (15) is connected to a side outlet, FIG. 9 a further preferred embodiment of the cleaning device before which a further precleaning device (15) is connected before the inlet into the dividing wall column (5).

In FIG. 1 the continuous total process of the polylactide production (PLA process) starting from lactic acid is represented. The process is subdivided thereby into the following partial steps which are implemented with the individual components which are integrated in the polymerisation device 100 and explained subsequently in more detail. The polymerisation device 100 thereby includes a cleaning device 1 according to the invention.

1. Concentration of Lactic Acid

The starting material for the process is lactic acid. The content of lactic acid must thereby be higher than 80% by weight. Preferably, the lactic acid concentration is thereby more than 90% because the water must be removed before polymerisation. The separation of water and lactic acid is thereby undertaken in a rectification column 101. A vacuum is thereby applied via a suction connection piece 103, the water present in vapour form is condensed and removed at the top via a further connection piece 104. The supply of the lactic acid is thereby effected continuously via a further connection piece 102. The distillate is pure water, the product occurring on the sump side is lactic acid with a concentration of more than 99% by weight.

In addition to separation of water from the original material (lactic acid), the rectification column 101 likewise serves for separation of the vapours from the precondensation reactors 105a and 105b. The vapour flows thereby comprise lactic acid, lactoyllactate, dilactide and water. The water is withdrawn at the top, lactic acid and derivatives thereof go into the sump of the rectification column and from there, together with the concentrated lactic acid, into the first precondensation reactor 105a.

2. Precondensation

The concentrated lactic acid is converted into a prepolymer in a series of two reactors 105a and 105b by polycondensation. The polycondensation takes place at two different pressures and temperatures in order to optimise the reaction conversion. In the first reactor 105a, the conditions are chosen such that the evaporation of lactic acid is minimised and the removal of water is facilitated at the same time. In the second step of the polycondensation, the reaction speed is increased by a higher temperature, the pressure is reduced at the same time in order further to reduce the water concentration in the melt. The average molar mass (number average) of the prepolymer is thereby between 500 and 2,000 g/mol.

3. Cyclising Depolymerisation

The prepolymer is in chemical equilibrium with the cyclic dimer of the lactic acid, the dilactide. By adjusting pressure and temperature in the depolymerisation reactor 106, it is ensured that the lactide is formed continuously from the prepolymer and evaporated. The vapour flow from the depolymerisation reactor 106 mainly comprises lactide. Water, lactic acid and the linear oligomers thereof are only present in subordinate quantities. A condenser is associated with the depolymerisation reactor 106, which condenser partially condenses the reaction vapours: water and the greatest part of lactic acid thereby remain in vapour form and are condensed extensively in the condensation device 107. The condensate from the depolymerisation reactor 106 first and foremost contains the lactide, lactoyllactate (the linear dimer of lactic acid) and higher linear oligomers. The condensate is also termed crude lactide. Lactide is present in two stereoisomeric forms: the optically active L-lactide and the mesolactide, made of a combination of an L(+)- and D(−)-lactic acid unit. The D(−)-units originate partly from the educt, partly they are formed by racemisation of L(+)-units during the prepolymerisation and the depolymerisation.

4. Lactide Cleaning

During the ring-opening polymerisation, the achievable molecular weight and hence significant mechanical properties of the polylactide depend upon the degree of purity of the lactide. The hydroxyl groups of the lactic acid and lactoyllactate contained as impurity thereby serve as the starting point of the polymerisation. The higher the concentration of the hydroxyl groups in the lactide, the less the achievable molecular weight of the polymer turns out to be. The concentration of the hydroxyl groups in the crude lactide is too high after the cyclising depolymerisation. The condensed lactide is cleaned in a cleaning device 1 according to the invention up to the required hydroxyl group concentration. The cleaned lactide is removed as a side flow from the cleaning device 1. The distillate and the sump product are supplied again to the process at various places. In addition to the molecular weight of the polylactide, its properties are greatly influenced by the D-content (the quantity of structural units which have the D-configuration).

5. Ring-Opening Polymerisation

The ring-opening polymerisation is undertaken in a reactor which is formed from a combination of a stirred vessel 109 and a tubular reactor 110. In the first reactor 109, the low-viscous lactide is polymerised to form PLA with a conversion rate of approx. 50%. Catalyst and additives are mixed homogeneously into the melt.

In the tubular reactor 110, the polymerisation reaction is continued until a chemical equilibrium between polymer and monomer is reached. The maximum conversion of the monomer is approx. 95%. During polymerisation, the viscosity is increased to approx. 10,000 Pa·s.

6. Demonomerisation

In order to obtain a stable polylactide, the monomer concentration of approx. 5% by weight in the melt is too high. For this reason, demonomerisation must be implemented. This is achieved in a twin-screw extruder 111 by degassing the melt. On the basis of the fact that the ring-opening polymerisation is an equilibrium reaction, a stabiliser is added before the demonomerisation in order to prevent the re-formation of the monomer during and after the degassing.

7. Granulation and Crystallisation

Subsequent to the demonomerisation, the melt is removed from the extruder 111 and converted into a granulate 112. Both strand granulation or underwater granulation can thereby be implemented. In both cases, the PLA granulate must be crystallised before drying and packaging. The crystallisation is implemented at increased temperatures and with agitation until the granulate no longer adheres together.

Figure 2:
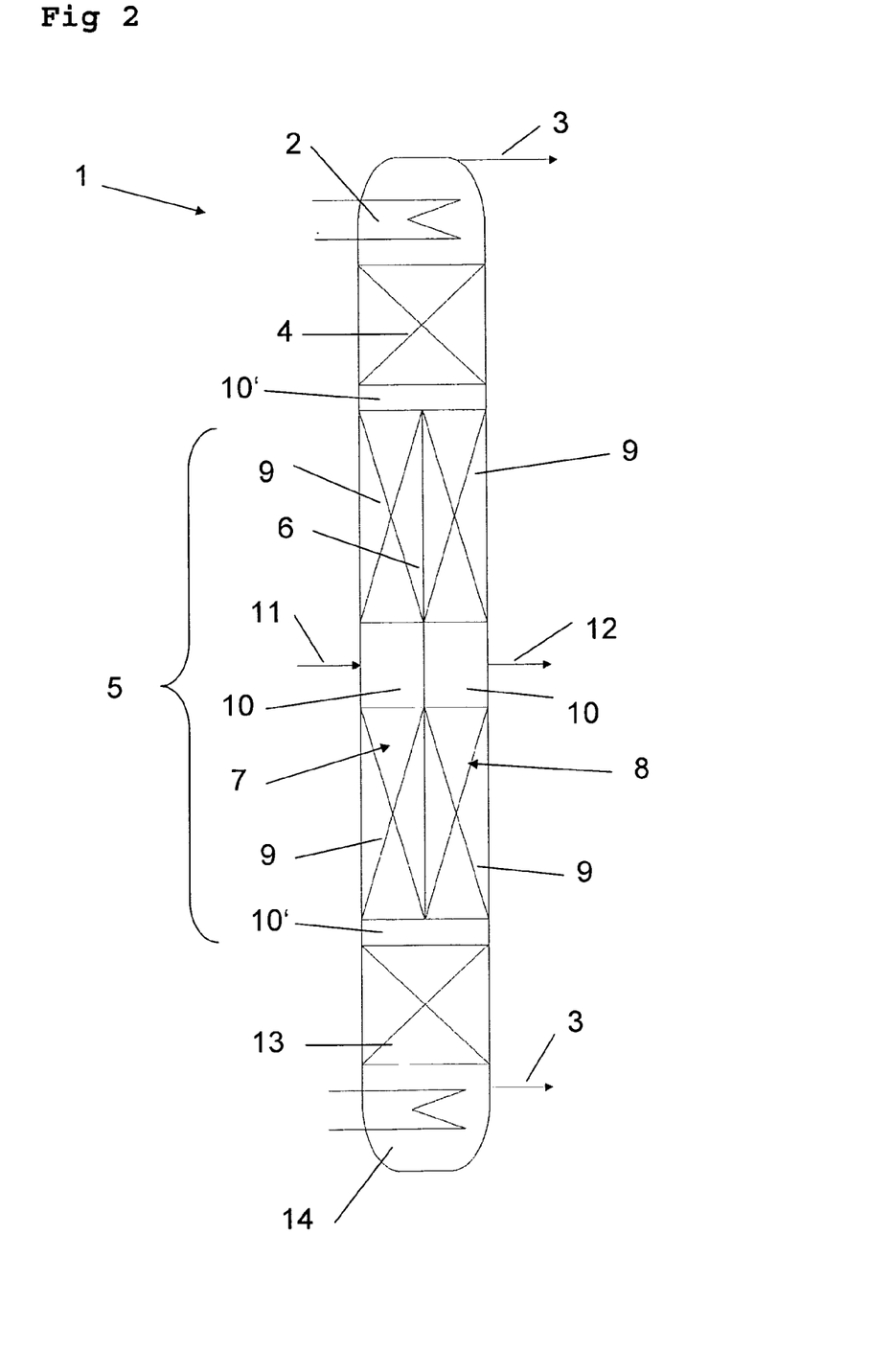

FIG. 2 shows the simplest embodiment of the cleaning device 1 according to the invention. Starting from the top, the latter has the following components: a dephlegmator 2 for condensation of the vapours coming from the dividing wall region 5, which vapours comprise for the most part readily volatile materials, such as for example water or lactic acid, fitted at the top an outlet 3 and also, connected to the dephlegmator, a mass transfer packing 4 which can be separated if necessary also from the dephlegmator 2 via a further gap (not illustrated). Below the mass transfer packing 4 there is located a gap 10', against which the dividing wall region of the column which enables separation of the material mixture in only one column abuts. The dividing wall column has a vertical dividing wall 6 and is hence separated into two zones, namely the prefractionation zone 7 and the main fractionation zone 8. The two zones have respectively two mass transfer packings 9 which are separated from each other respectively by gaps 10. The prefractionation zone 7 thereby has an inlet 11 for supplying the material mixture, whilst the main fractionation zone 8 has a side outlet 12 for removing the cleaned dilactide. Below the dividing wall column 5 there is situated a further gap 10' and also a further mass transfer packing 13. A falling-film evaporator 14 is provided at the sump side, preferably next to the sump container or the device 1. The falling-film evaporator 14 can be separated from the mass transfer packing 13 if necessary via a further gap. In the region of the falling-film evaporator 14, an outlet 3 is likewise present for removing linear oligomers and also dilactide. The falling-film evaporator 14 is mounted laterally on the column unit.

Figure 3:
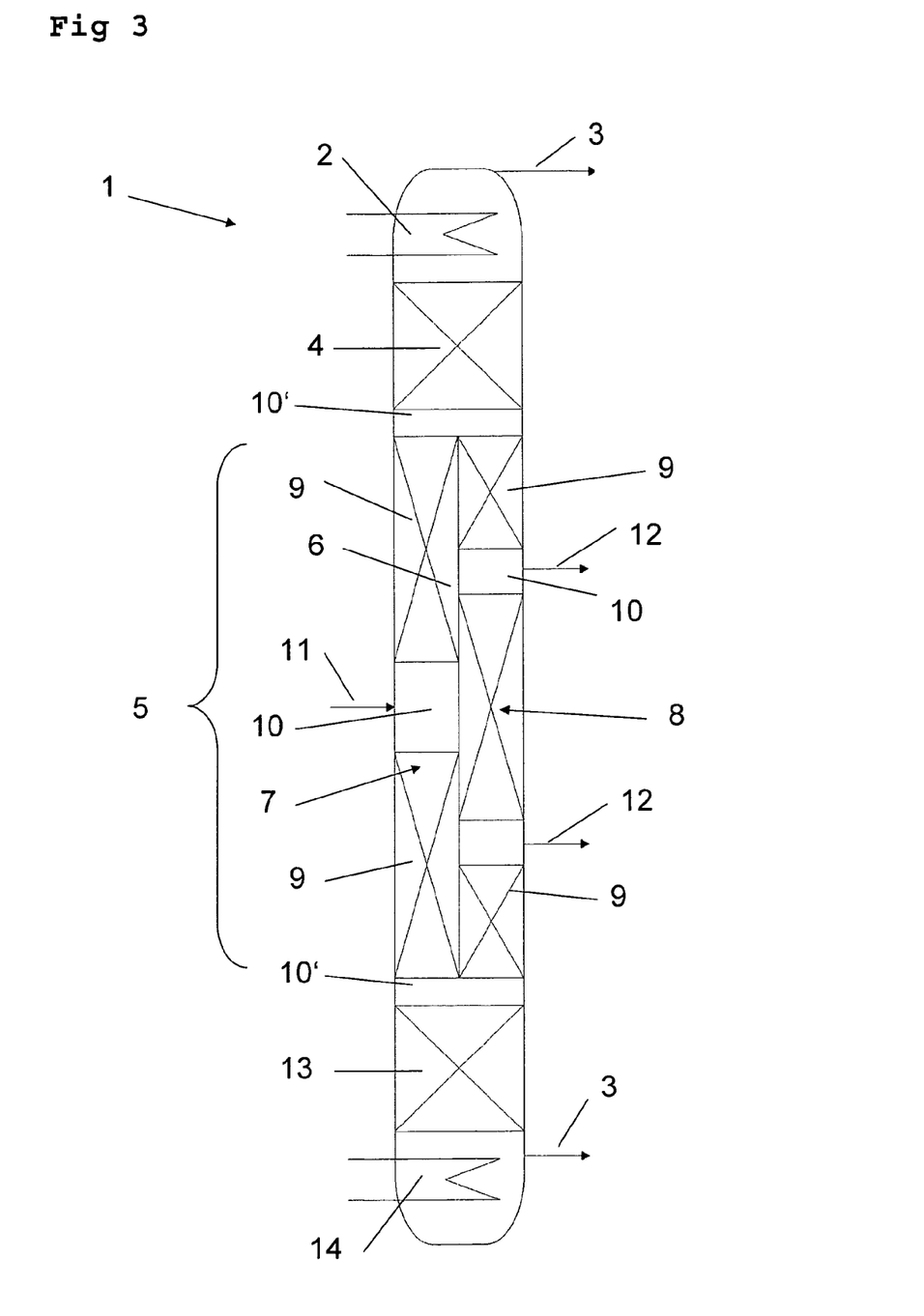

In FIG. 3, a similar embodiment to FIG. 1 is represented, the only difference existing in the embodiment of the dividing wall column 5. In contrast to the embodiment in FIG. 2, here the main fractionation zone 8 has three mass transfer packings 9 which are separated from each other respectively by a gap 10. Each of these gaps thereby has a side outlet 12. It is made possible as a result of this embodiment of the dividing wall column 5 that a material separation is effected at the same time in such a manner that the components present in the ingoing material mixture, such as lactic acid and water, are withdrawn at the top and the oligomers at the sump, whilst the main component of the dilactide can be removed via the side outlets 12. At the same time, a separation of the stereoisomers is thereby effected, the mesodilactide-rich fraction being able to be removed in the upper of the two side outlets 12 and the L-dilactide-rich fraction via the lower of the two side outlets 12 so that material separation of the individual components in addition to an optical separation of the lactide stereoisomers is effected simultaneously.

Figure 4:
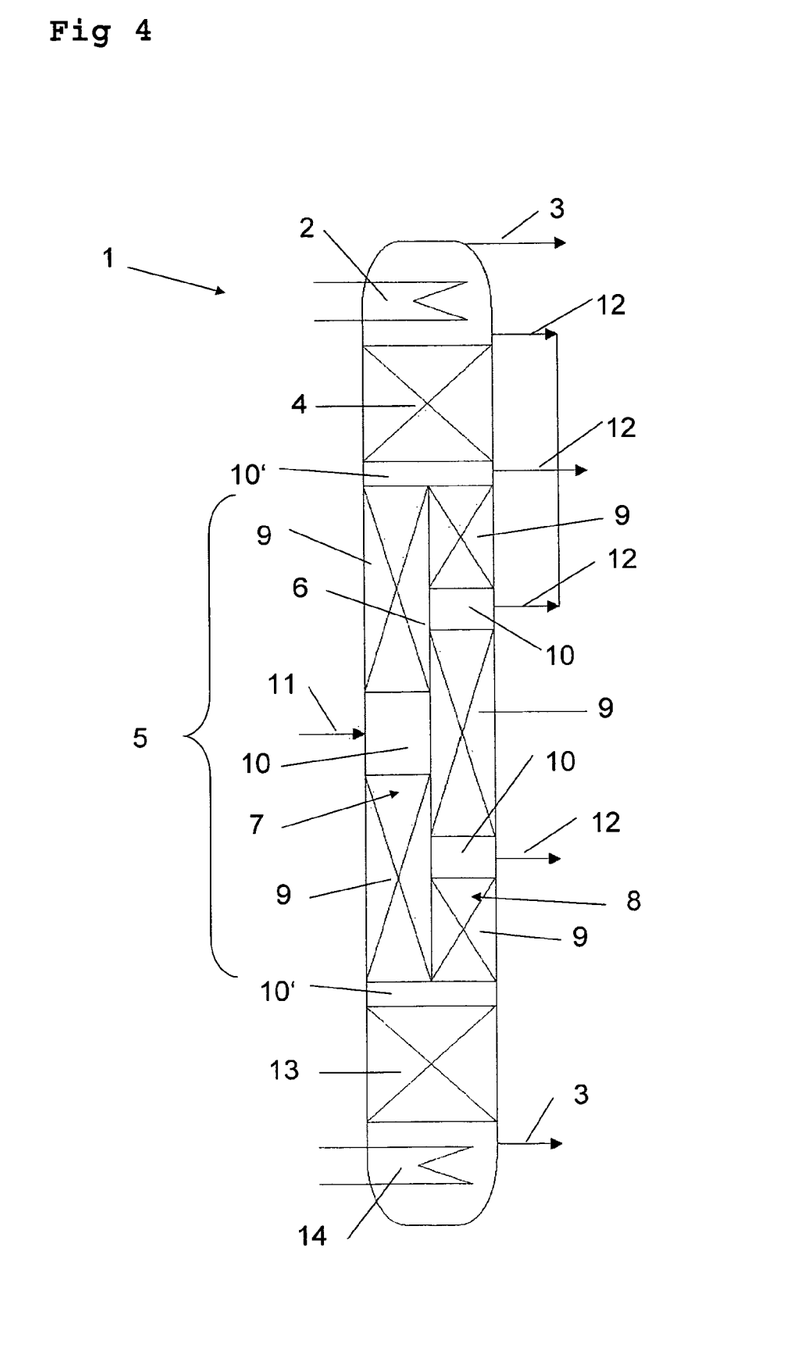

The upper side outlet 12 is not absolutely necessarily disposed thereby in the region of the dividing wall 6 but can also, as represented in FIG. 4, be provided at gaps 10 of the cleaning device 1 which are disposed further up. The possibility is also presented that a plurality of side outlets 12 is present at various positions.

Figure 5:
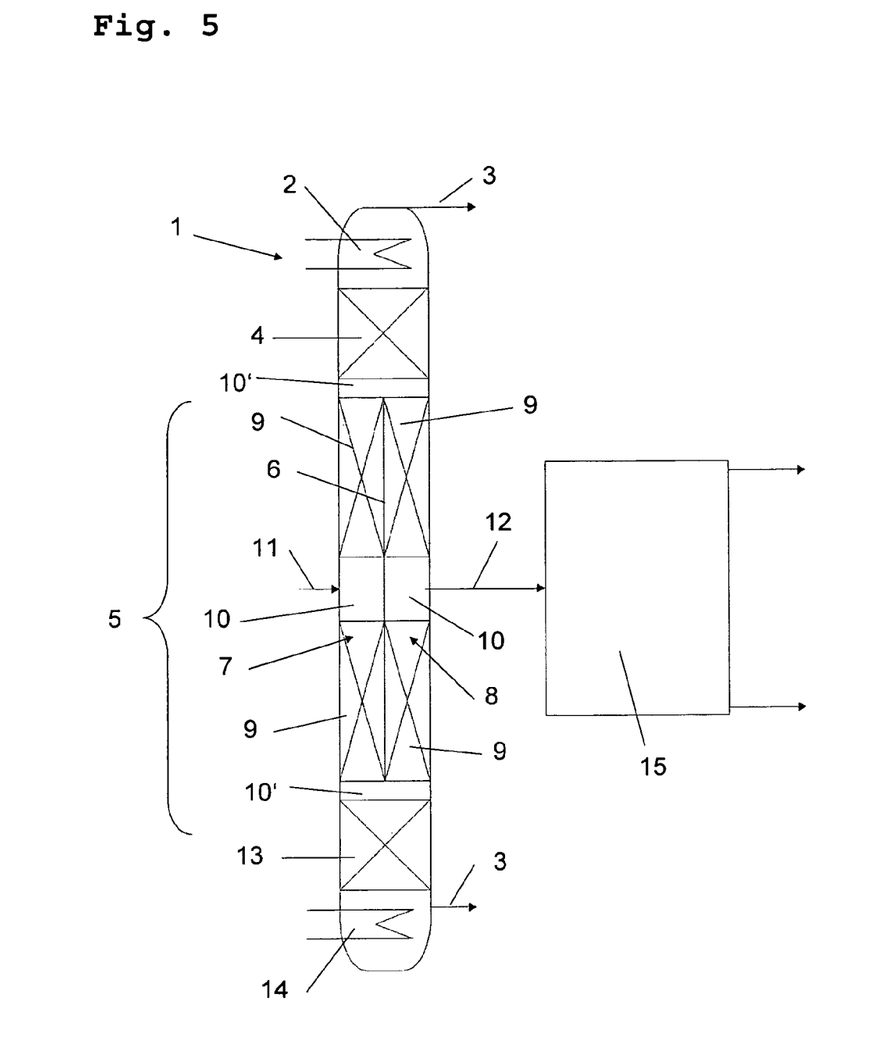

An embodiment is represented in FIG. 5 in which the cleaning device 1 is configured with only one side outlet 12, to which a further cleaning device 15 is connected. This cleaning device 15 can be either a rectification column 16 or a crystallisation device 18 (cf. FIG. 7) and serves for separation of L-dilactide and mesodilactide.

Figure 6:
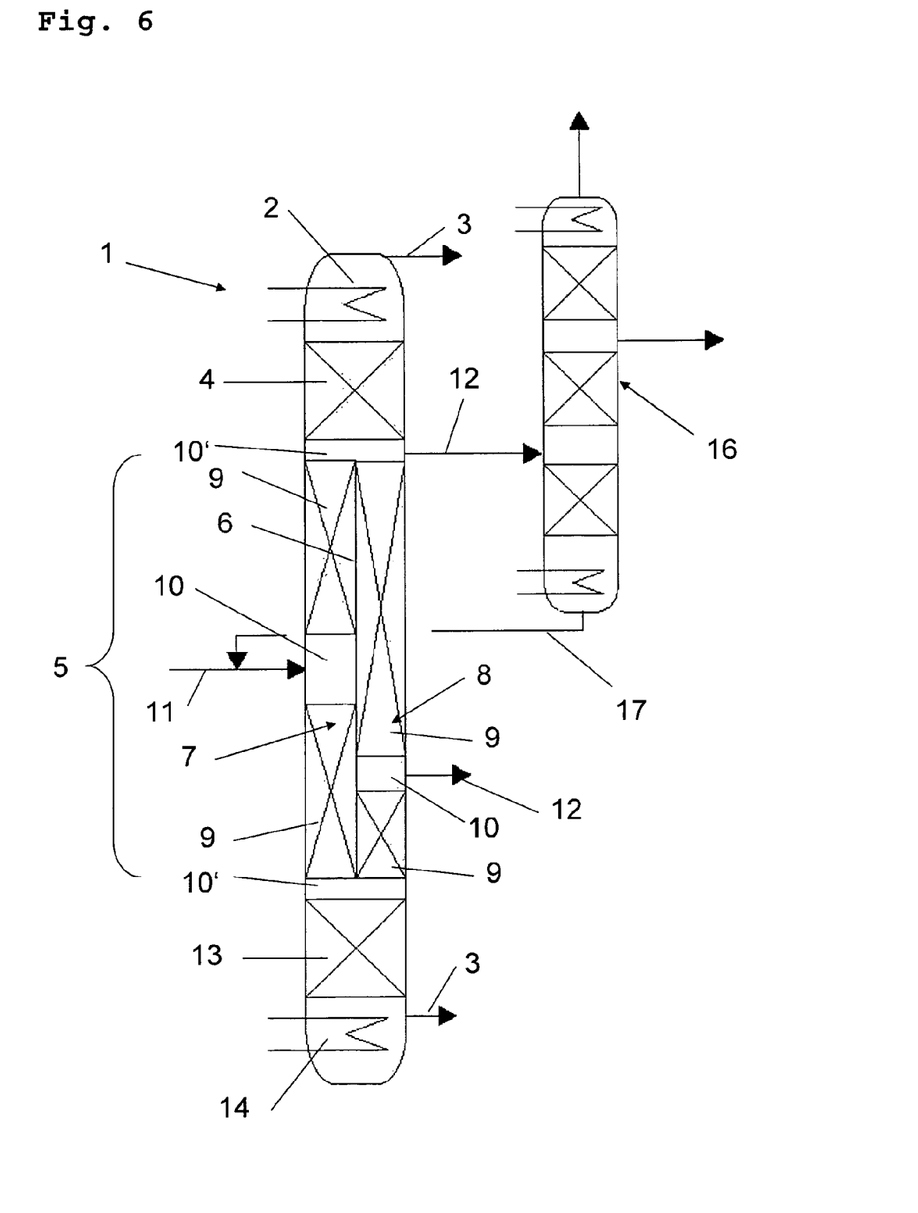

An embodiment is represented in FIG. 6 in which separation into a mesodilactide-rich fraction and an L-dilactide-rich fraction is effected via the cleaning device 1, the L-dilactide-rich fraction being withdrawn via a side outlet 12 which is disposed further towards the sump and in the region of the dividing wall column 5. The mesodilactide-rich fraction which is removed at the side outlet 12 disposed further towards the top, is fed into a rectification column 16 for optimisation of the mesodilactide content, a mesodilactide-optimised fraction being able to be obtained with a mesodilactide content of >90%. From the rectification column, an L-dilactide-rich mixture with an L-dilactide content of >80% is thereby obtained on the sump side and is fed back into the supply line 11 of the dividing wall column 5 via a recirculation 17.

Figure 7:
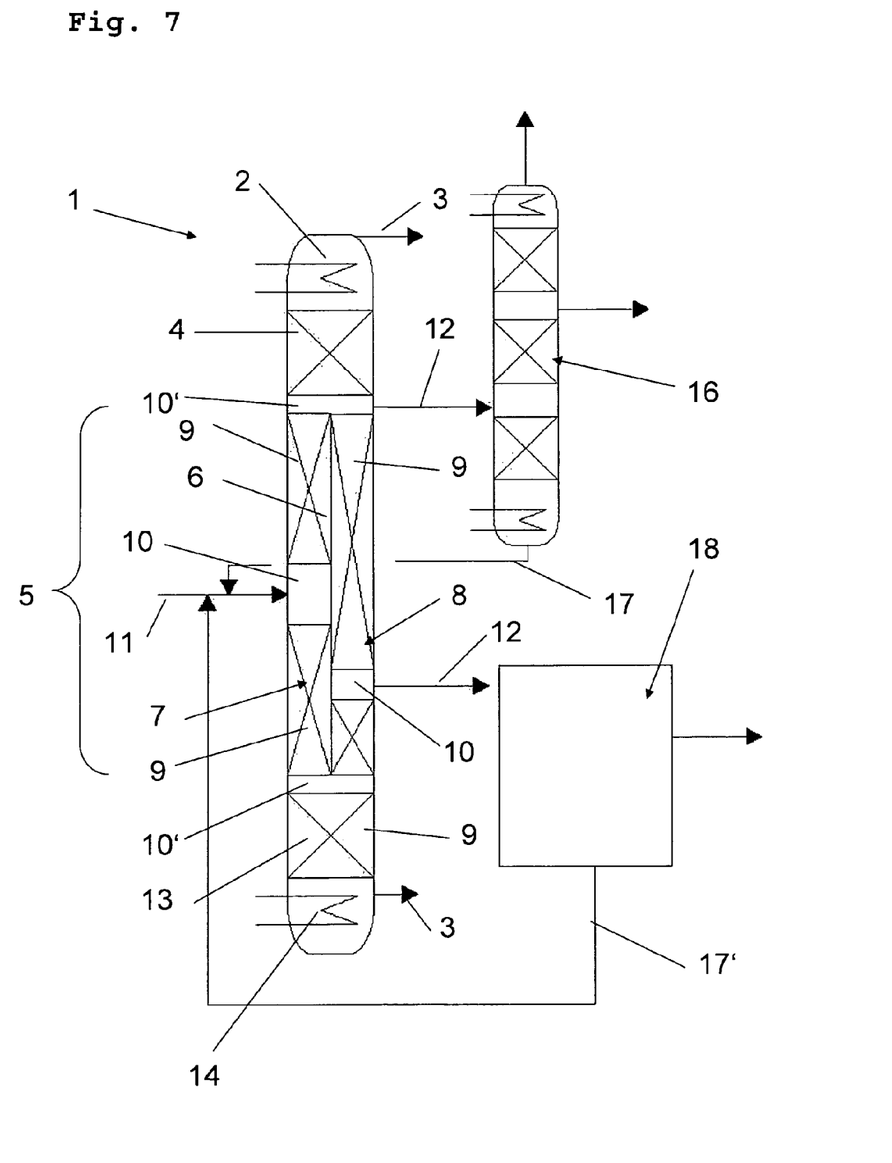

FIG. 7 thereby shows a form of a device, as already represented also in FIG. 6, in addition a device for melt crystallisation 18 also being present in order further to increase the L-dilactide content of the L-dilactide-rich fraction. L-dilactide is thereby crystallised out; mesodilactide remains in the melt and is supplied to the supply line 11 of the column 1 via a recirculation line 17'. The thus obtained L-dilactide has an L-dilactide content of >99% and a carboxyl group concentration of <10 mmol/kg, and hence is suitable for direct use for the polymerisation and production of PLA.

Figure 8:
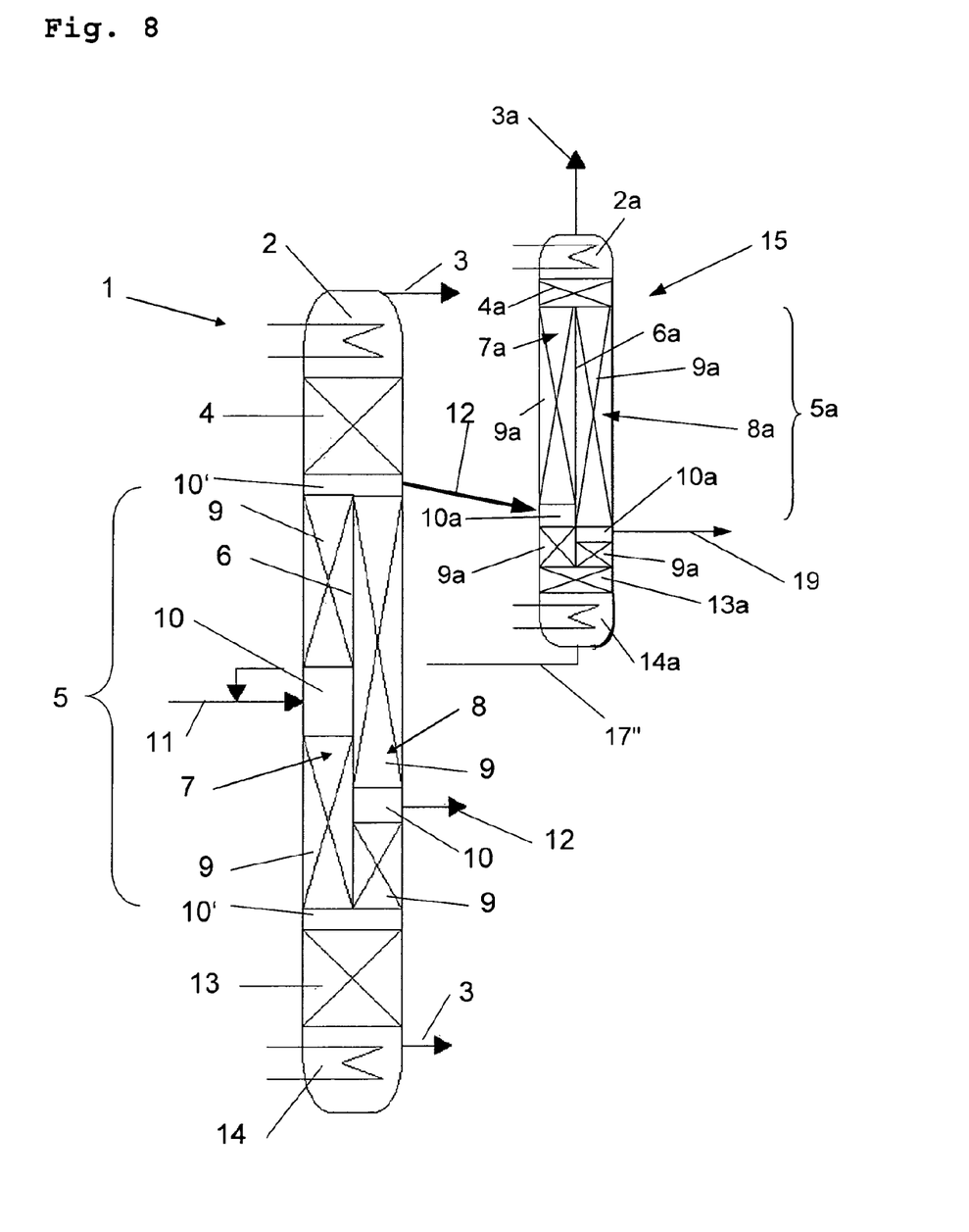

FIG. 8 shows a cleaning device in which two cleaning devices according to the invention, as described in claim 1, are connected in succession. In this special embodiment, the left cleaning device, represented in FIG. 8, represents for example a cleaning device according to FIG. 3 which includes a dividing wall column, the same components here being provided with the same reference numbers. The cleaned material mixture removed for example from the upper side outlet 12 is thereby supplied to a further cleaning device 15 according to the invention which includes a dividing wall column and is represented on the right in FIG. 8. The corresponding elements of the cleaning device according to the invention which are also provided on the further cleaning device 15 are hereby provided with the analogous reference numbers 2a to 14a. This further cleaning device 15 has for example a side outlet 19 via which for example highly pure mesolactide can be removed. In order to increase the efficiency and to ensure a continuous process, the outlet of the further cleaning device 15, which is disposed on the sump side, is connected via an outflow 17" to the inflow 11 of the first cleaning device 1.

Figure 9:
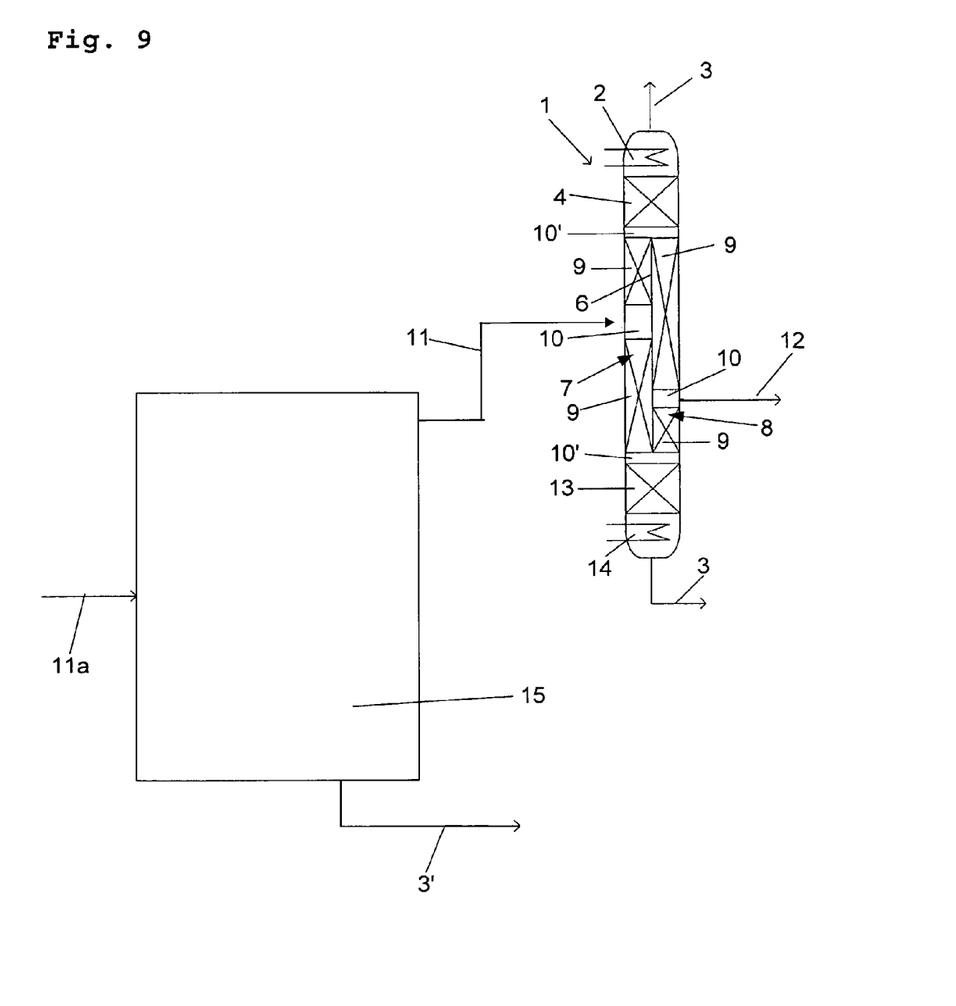

A further variant according to the invention of the cleaning device is represented in FIG. 9. There is hereby connected before the cleaning device 1 which includes the dividing wall column, a further cleaning device 15 which serves for pre-cleaning the educt mixture which is used. The educt (11a, crude lactide) is separated in the additional cleaning device into an L-dilactide-rich fraction 3' and a mesodilactide-rich fraction 11. The mesodilactide-rich fraction 11 comprises mesodilactide, L-dilactide, lactic acid and linear oligomers thereof and residual water. This fraction is separated in the cleaning device 1 into a vaporous top product, a liquid side product, which comprises mesodilactide to a large percentage and the carboxyl group concentration of which is very low, and a sump product which is composed of oligomers and L-dilactide.

The L-dilactide-rich fraction 3' of the additional cleaning device has a content of L-dilactide of more than 98% and a carboxyl group concentration of less than 10 mmol/kg. The further cleaning device is thereby a crystallisation device in a particularly preferred embodiment.

The cleaning device 15 can be used also for preseparation of D-lactide and mesolactide instead of L-lactide.

Description of the Test Arrangement

In a pilot plant, approx. 2.6 kg/h of a lactic acid prepolymer are depolymerised continuously to form vaporous dilactide. The vapours from the reactor are a mixture of dilactide, water, lactic acid and lactoyllactate and linear oligomers of lactic acid. These vapours were partially condensed in a dephlegmator so that the large part of the water and a part of the lactic acid remain in vapour form. Dilactide, residual lactic acid and the oligomers thereof form the condensate (crude dilactide). The throughput is approx. 2.5 kg/h.

The carboxyl end groups (acid-base titration) and the mesodilactide content (HPLC with chiral column) and also the melting point (DSC) of the crude dilactide are measured. In one sample, typically the following values are measured:
COOH=250 mmol/kg,
mesodilactide content: 11.8%,
melting point: 87° C.

The crude dilactide is then supplied continuously to a dividing wall column according to FIG. 1.

At the top of the column, a mixture of dilactide and the more readily volatile components, such as water and lactic acid, are removed and, in the sump of the column, the oligomers of the lactic acid and the residual content of dilactide are removed. The cleaned dilactide is withdrawn as a side flow.

The dividing wall column has a diameter of 100 mm. It is filled with packings which have a specific surface area of 750 $m^2/m^3$. The height of the column without evaporator part and condenser part is 9.75 m. A magnetically controlled pendulum which distributes the backflow to the two dividing wall halves is located above the two dividing wall halves. The division ratio can thereby be adjusted continuously.

A heater with a heating power of 3 kW (corresponding to 100%) is located in the sump of the column

EXAMPLE 1

The sump temperature is controlled to 160° C. with a constant crude dilactide inflow. A pressure loss over the column of 6 mbar at a top pressure of 30 mbar results. The temperature of the coolant for the condenser is set at 115° C. in the preflow. The division ratio is 7:5.

The pure dilactide has a throughput of approx. 1500 g/h.

The carboxyl end group content in the pure dilactide is on average 43 mmol/kg.

EXAMPLE 2

The sump temperature is controlled to 164° C. with a constant crude dilactide inflow. The pressure at the top of the column is controlled to 22 mbar. A pressure loss over the column of 10 mbar results. The temperature of the coolant for the condenser is set at 124° C. in the preflow. The division ratio is 7:5.

764 g/h are removed in the sump in the case of a pure dilactide throughput of 1523 g/h. 209 g/h are produced at the top of the column.

The carboxyl end group content in the pure dilactide is no more than 12 mmol/kg.

EXAMPLE 3

The settings of example 2 are maintained apart from the pressure at the top of the column. This is lowered to 20 mbar. A pressure loss of 9 mbar results. The quantity of vaporous top product is increased to 277 g/h, 774 g/h are removed in the sump and the pure dilactide yield is 1525 g/h.

The carboxyl end group content in the pure dilactide is no more that 5 mmol/kg.

EXAMPLE 4

The dividing wall column is widened by an additional side discharge (see FIG. 3), the upper and lower side discharge being situated in the dividing wall region. The conditions and settings are otherwise as in example 2. The dilactide fraction withdrawn from the upper side discharge has a throughput of 400 g/h, a mesodilactide content of 42% and a carboxyl end group content of 17 mmol/kg.

For the lower dilactide fraction, the following values are measured:
throughput: 1600 g/h
mesodilactide content: 6%
carboxyl end group content: 10 mmol/kg

EXAMPLE 5

The settings of example 4 are maintained, except that the discharge of the mesodilactide-rich fraction is effected now directly below the condenser of the column, as represented in FIG. 4. The fraction has a carboxyl end group content of 176 mmol/kg, a mesodilactide content of 68% and a throughput of 330 g/h.

For the lower dilactide fraction, the following values are measured:
throughput: 1600 g/h
mesodilactide content: 3%
carboxyl end group content: 13 mmol/kg

EXAMPLE 6

The mesodilactide-depleted pure dilactide fraction of example 4 is subjected in the laboratory to a fractionated crystallisation from the melt. For this purpose, 400 ml liquid dilactide are poured into a 500 ml glass flask with a double-walled jacket and a heated outlet valve, the temperature in the double-walled jacket is set at 70° C. and it is kept overnight at this temperature. The next morning, the non-crystallised liquid fraction can be separated from the crystalline fraction. The liquid fraction has a carboxyl end group content of 122 mmol/kg and a mesodilactide contact of 30%.

The crystalline fraction is molten at 110° C. and withdrawn. A carboxyl end group content of 12 mmol/kg and a mesodilactide content of 2% is measured.

The crystallised-out fraction is subjected to a further crystallisation step. The twice-crystallised dilactide has a mesodilactide content of 0.4% and a carboxyl end group content of 2 mmol/kg.

EXAMPLE 7

With commercial software for calculating process technological processes, the separation of the mesodilactide-rich fraction of example 5 into a lactic acid-rich top product, a mesodilactide-rich side fraction and an L,L-dilactide-rich sump product by rectification is simulated by computer, which corresponds to an embodiment according to FIG. 4.

The vapour pressure curves for L,L-dilactide and mesodilactide are deduced from DE 38 20 299. The phase equilibria are calculated with the UNIFAC method.

The rectification column is specified in the following manner:
top pressure: 45 mbar
pressure loss over the column: 10 mbar
temperature of the condensate: 145° C.
number of theoretical bases: 47
inflow base: 23
base of the side outlet: 8
temperature in the column sump: 166° C.

The following product composition is obtained:
meso-fraction: 95% mesodilactide, carboxyl end group content less than 20 mmol/kg,
L-fraction: 90% L,L-dilactide, 10% mesodilactide,
top product: 76% mesodilactide, carboxyl end group content 2650 mmol/kg

EXAMPLE 8

Example 8 describes an embodiment in which the cleaning of the mesodilactide-rich fraction from the cleaning device 1 is effected in a rectification column with dividing wall (see FIG. 8).

The dividing wall column for recovering L,L-dilactide and for cleaning the mesodilactide is operated as follows:

| | |
|---|---|
| 15 mbar | top pressure |
| 10 mbar | pressure loss over column |
| 123° C. | top temperature (condensation temperature) |
| 45 | number of theoretical separation steps |
| 15 | inflow base |
| 31 | side outlet at the bottom |
| 145° C. | sump temperature |

The column is equipped with mass transfer packings of the Mellapak type by the company Sulzer. The recirculation is distributed in the ratio 1:2 to the inflow side and the side of the product withdrawal. The inflow has a carboxyl group concentration of 150 mmol/kg and a mesolactide content of 70%. The side flow from the cleaned mesolactide still contains 5% L,L-dilactide and has carboxyl groups of 4 mmol/kg. The sump product has 24% mesolactide, it is recirculated into the first cleaning device. The top product contains 75% mesolactide and carboxyl groups of 2.700 mmol/kg.

EXAMPLE 9

Example 9 describes the production of the poly-mesolactide:

Mesolactide with 5% L,L-dilactide is withdrawn in a quantity of 9 kg/h from a dividing wall column as a side flow and is supplied to a continuously operated stirred vessel reactor. The content of carboxyl groups is 4 mmol/kg. Tin(II)octoate is metered into the agitated vessel as catalyst in addition to the mesolactide in a quantity which corresponds to 300 ppm tin relative to the mass of the polymer.

The melt polymerises in the vessel at a temperature of 140° C. and at a dwell time of 2 hours until conversion of the mesolactide of 60%. An anchor agitator ensures the required mixing at 150 rpm. The partially converted melt leaves the agitated vessel and proceeds into a tubular reactor which is equipped with baffles for standardisation of the flow velocity over the cross-section. In the tubular reactor, the conversion rises within 4 hours to 95% at the outlet at a temperature of 140° C. Stabilisation and demonomerisation take place in the same way as described for the polymerisation of L-dilactide. The same applies to the granulation.

What is claimed is:

1. A method for continuous production of polylactide, the method comprising:
obtaining or providing a starting material mixture comprising mesodilactide having a chemical structure of Formula I Formula I and the starting material mixture further comprising at least one of D-lactic acid and L-lactic acid of Formula II Formula II separating cleaned mesodilactide from the starting material mixture with a cleaning device, the separating comprising
  a) feeding the material mixture into a cleaning device comprising a dividing wall column, the cleaning device comprising at least the following components which are arranged from top to bottom in the sequence
    aa) at the top, at least one dephlegmator and also at least one outlet,
    bb) at least one mass transfer packing which fills the diameter of the device at least partially,
    cc) the dividing wall column which is divided into two zones by a vertical dividing wall, each zone comprising at least two mass transfer packings which are separated from each other respectively by a gap, the first zone comprising a prefractionation zone comprising at least one inlet for supplying the material mixture and the second zone comprising a main fractionation zone comprising at least one side outlet for removing the cleaned product, and the at least one inlet and also the at least one side outlet being located respectively in the region of the at least one gap,
    dd) at least one further mass transfer packing which fills the diameter of the device at least partially,
    ee) on a sump side, at least one evaporator and at least one outlet, a length ratio of the dividing wall column to a total length of the cleaning device comprising approximately 0.5 to 0.9,
  b) separating the material mixture, the acid of Formula II leaving the column in a vaporous aggregate and
  c) removing the cleaned mesodilactide via the at least one side outlet; and
polymerizing the cleaned mesodilactide, providing polylactide comprising at least about 70 wt % poly-mesodilactide.

2. The method of claim 1, wherein mesodilactide is at least about 50 wt % of the starting material mixture.

3. The method of claim 1, wherein mesodilactide is at least about 80 wt % of the starting material mixture.

4. The method of claim 1, wherein the cleaned mesodilactide has a concentration of free carboxylic acid groups of at most about 50 mmol/kg.

5. The method of claim 1, wherein
  a) the polymerisation is controlled such that the obtained poly-mesodilactide has a molar mass $M_n$ of approximately 50,000 g/mol to about 2,000,000 g/mol, and/or
  b) a catalyst is used during the polymerization.

6. The method of claim 1, wherein the starting material mixture further comprises at least one of linear dimers of lactic acid, linear oligomers of lactic acid, and water.

7. The method of claim 1, wherein the cleaned mesodilactide is in a liquid aggregate state.

8. The method of claim 1, wherein the starting material mixture comprises at least one oligomer having a chemical structure of Formula III, Formula III wherein n=1 to 10.

9. The method of claim 1, further comprising withdrawing water from the top of the column and further comprising withdrawing as sump product one or more oligomers of the acid of Formula II.

10. The method of claim 1, further comprising withdrawing the acid of Formula II from the top of the column.

11. The method of claim 1, comprising supplying the starting material mixture to the dividing wall column as a vapor, liquid, or as a two-phase mixture.

12. The method of claim 1, wherein at least one further cleaning device is connected before the inlet comprising at least one of a rectification device and a crystallization device.

13. The method of claim 1, wherein subsequent to at least one of the side outlets, at least one further cleaning device is connected comprising at least the following components which are arranged from top to bottom in the following sequence:
  a) at the top, at least one dephlegmator and also at least one outlet,
  b) at least one mass transfer packing which fills the diameter of the device at least partially,
  c) a dividing wall column which is divided into two zones by a vertical dividing wall, each zone having at least two mass transfer packings which are separated from each other respectively by a gap, the first zone comprising a prefractionation zone comprising at least one inlet, with at least one side outlet of the dividing wall column for supplying the material mixture and the second zone comprising a main fractionation zone comprising at least one side outlet for removing the cleaned product, and the at least one inlet and also the at least one side outlet being located respectively in the region of the at least one gap,
  d) at least one further mass transfer packing which fills the diameter of the device at least partially,
  e) on a sump side, at least one evaporator and at least one recirculator which is connected to the inlet.

14. The method of claim 1, wherein after removal of the cleaned mesodilactide is effected, prior to the polymerizing, further comprising at least partially separating L-dilactide from the cleaned mesodilactide to give a L-dilactide-rich fraction and a mesodilactide-rich fraction.

15. The method of claim 14, wherein the further separation comprises at least one of rectification in a rectification column, rectification in a cleaning device which includes a dividing wall column, and crystallisation.

16. The method of claim 14, wherein mesodilactide is at most about 10 wt % of the L-dilactide-rich fraction.

17. The method of claim 14, wherein L-dilactide is at most about 60 wt % of the mesodilactide-rich fraction.

18. The method of claim 14, further comprising producing a product comprising poly-L-lactide from the L-dilactide-rich portion.

19. A method for continuous production of polylactide, the method comprising:
  obtaining or providing a starting material mixture comprising mesodilactide having a chemical structure of Formula I Formula I and the starting material mixture further comprising at least one of D-lactic acid and L-lactic acid of Formula II

Formula II separating cleaned mesodilactide from the starting material mixture with a cleaning device, the separating comprising
- a) feeding the material mixture into a cleaning device comprising a dividing wall column, the cleaning device comprising at least the following components which are arranged from top to bottom in the sequence
  - aa) at the top, at least one dephlegmator and also at least one outlet,
  - bb) at least one mass transfer packing which fills the diameter of the device at least partially,
  - cc) the dividing wall column which is divided into two zones by a vertical dividing wall, each zone comprising at least two mass transfer packings which are separated from each other respectively by a gap, the first zone comprising a prefractionation zone comprising at least one inlet for supplying the material mixture and the second zone comprising a main fractionation zone comprising at least one side outlet for removing the cleaned product, and the at least one inlet and also the at least one side outlet being located respectively in the region of the at least one gap,
  - dd) at least one further mass transfer packing which fills the diameter of the device at least partially,
  - ee) on a sump side, at least one evaporator and at least one outlet, a length ratio of the dividing wall column to a total length of the cleaning device comprising approximately 0.5 to 0.9,
- b) separating the material mixture, the acid of Formula II leaving the column in a vaporous aggregate state and
- c) removing the cleaned mesodilactide via the at least one side outlet; and polymerizing the cleaned mesodilactide, providing polylactide comprising at least about 90 wt % poly-mesodilactide.

20. A method for continuous production of polylactide, the method comprising:

obtaining or providing a starting material mixture comprising mesodilactide having a chemical structure of Formula I Formula I and the starting material mixture further comprising at least one of D-lactic acid and L-lactic acid of Formula II Formula II separating cleaned mesodilactide from the starting material mixture with a cleaning device, wherein the cleaned mesodilactide has a concentration of free carboxylic acid groups of at most about 20 mmol/kg, the separating comprising
- a) feeding the material mixture into a cleaning device comprising a dividing wall column, the cleaning device comprising at least the following components which are arranged from top to bottom in the sequence
  - aa) at the top, at least one dephlegmator and also at least one outlet,
  - bb) at least one mass transfer packing which fills the diameter of the device at least partially,
  - cc) the dividing wall column which is divided into two zones by a vertical dividing wall, each zone comprising at least two mass transfer packings which are separated from each other respectively by a gap, the first zone comprising a prefractionation zone comprising at least one inlet for supplying the material mixture and the second zone comprising a main fractionation zone comprising at least one side outlet for removing the cleaned product, and the at least one inlet and also the at least one side outlet being located respectively in the region of the at least one gap,
  - dd) at least one further mass transfer packing which fills the diameter of the device at least partially,
  - ee) on a sump side, at least one evaporator and at least one outlet, a length ratio of the dividing wall column to a total length of the cleaning device comprising approximately 0.5 to 0.9,
- b) separating the material mixture, the acid of Formula II leaving the column in a vaporous aggregate state and
- c) removing the cleaned mesodilactide via the at least one side outlet; and polymerizing the cleaned mesodilactide, providing polylactide comprising at least about 70 wt % poly-mesodilactide.

* * * * *